Figure 1:
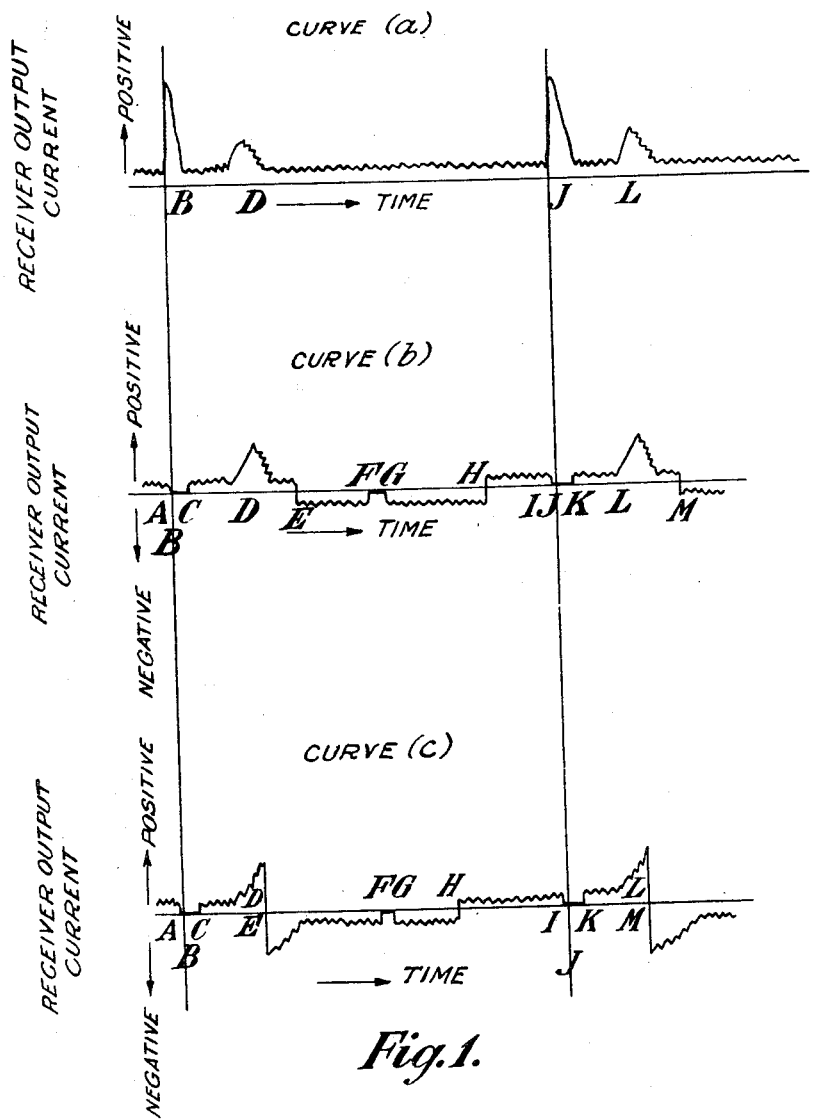

Nov. 14, 1950  
J. WATT  
2,530,035  
ECHO SOUNDER AND OTHER DEVICE FOR  
DISTANCE MEASURING IN WATER  
Filed Jan. 13, 1948  
3 Sheets-Sheet 2
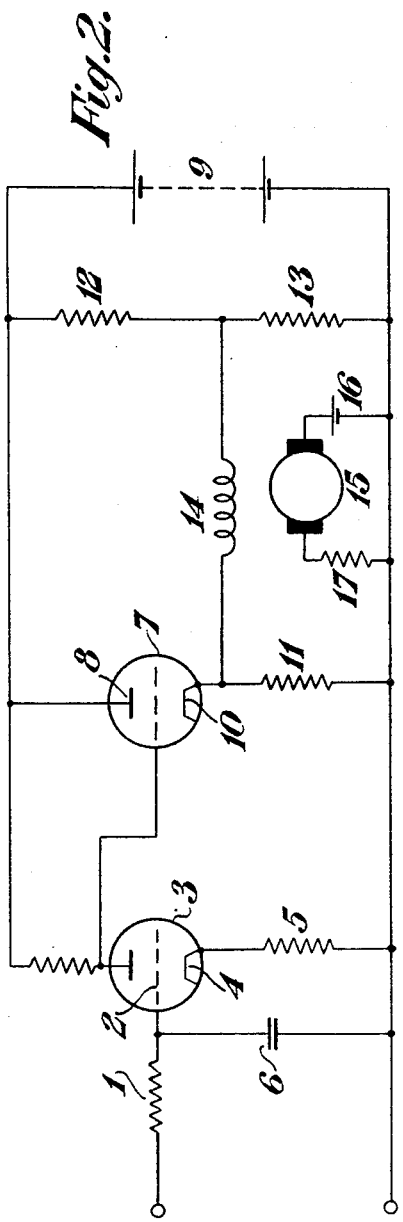
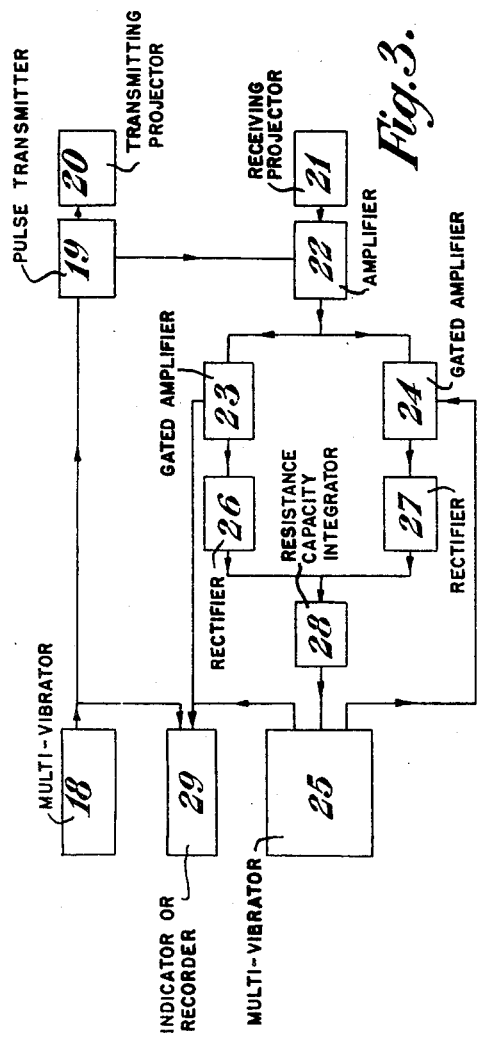

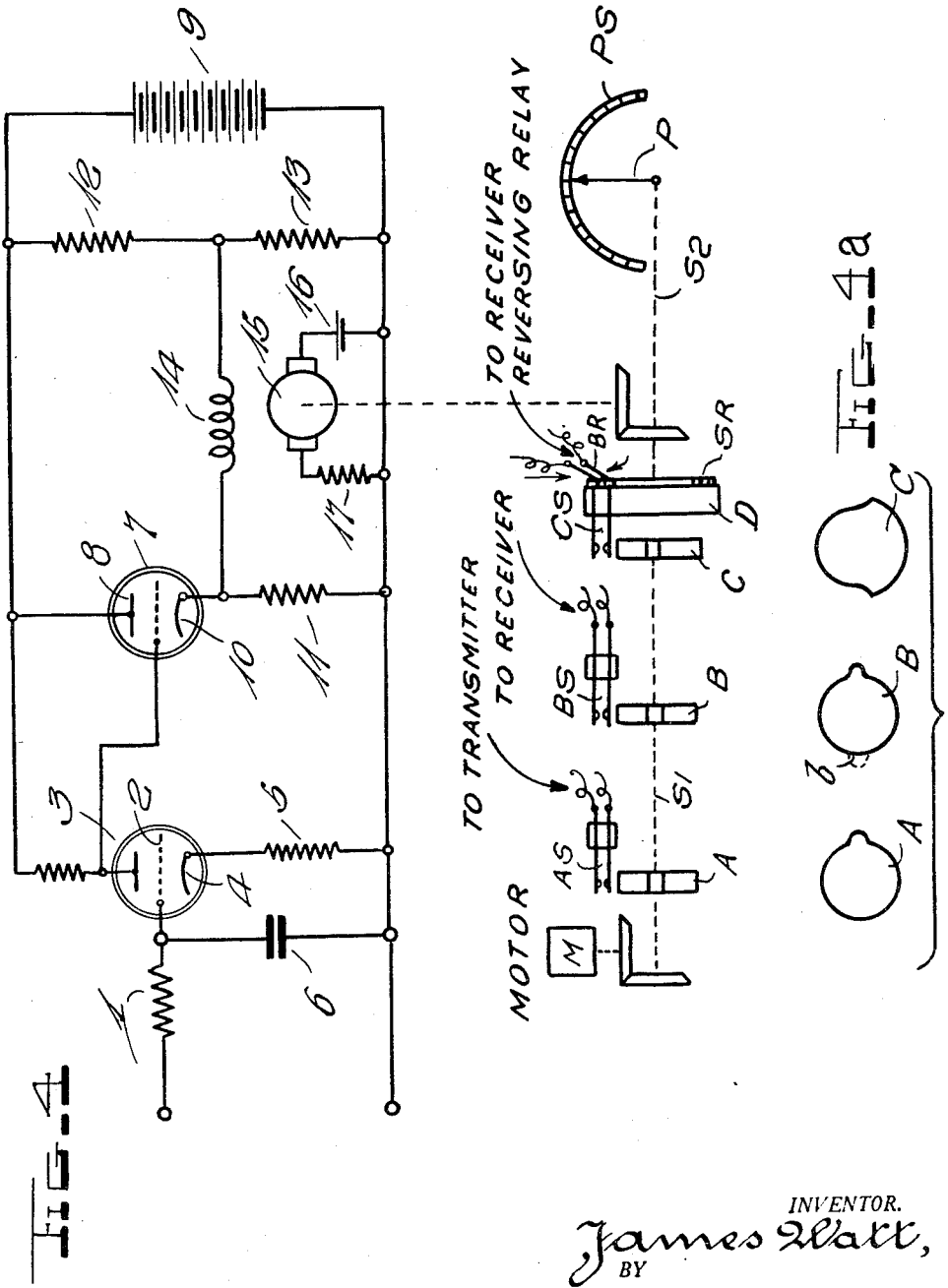

Patented Nov. 14, 1950

2,530,035

UNITED STATES PATENT OFFICE 2,530,035

ECHO SOUNDER AND OTHER DEVICE FOR DISTANCE MEASURING IN WATER

James Watt, Chelmsford, England, assignor to Marconi Sounding Device Company Limited, London, England, a company of Great Britain Application January 13, 1948, Serial No. 2,073
In Great Britain January 15, 1947

7 Claims. (Cl. 177—386)

This invention relates to echo sounders and other devices for distance measuring in water and more particularly to distance measuring devices of the periodic pulse echo type, that is to say, to devices of the type in which a pulse is transmitted periodically from a projector to a reflecting object—in the case of an echo sounder, the sea bottom—and the distance of said reflecting object is measured in terms of the time delay between transmission of a pulse and reception of the reflection or echo thereof. The period at which the transmitted pulses are sent out is usually referred to as the transmission period and will be so referred to in this specification.

In the usual form of echo sounder of the type referred to the transmission period is chosen at a value longer than the maximum echo time, that is to say, longer than the time taken by a pulse to proceed to the reflecting surface and back again in the case of the longest distance which the device is designed to measure. In this way it is assured that there is no transmission between any particular transmitted pulse and the reception of the echo thereof.

The present invention has for its object to provide an improved and relatively simple echo sounder or other device for measuring distances in water which shall be capable of giving a continuous indication or record of depth or distance and which shall be to a high degree immune from false readings due to extraneous "noise" or due to occasional failure to receive echoes from particular pulses.

According to this invention an echo sounder or like distance measuring device of the type referred to comprises means for periodically transmitting pulses; means for limiting reception to a succession of sub-periods such that two successive sub-periods do not together exceed the transmission period in length, successive sub-periods being of such lengths and receiver sensitivity during alternate sub-periods being such that in the absence of received echoes the received energy content during alternate sub-periods averaged over a time which is long relative to the transmission period is substantially equal to the received energy content during the remaining alternate sub-periods averaged over the same time; means for comparing the averaged received energy content during alternate sub-periods with the averaged received energy content during the remaining sub-periods; means automatically actuated in dependence upon any inequality between the compared averaged energy contents for altering the times of commencement of said sub-periods until the compared averaged energy contents become equal; and means for indicating or recording distance or depth in terms of the time difference between transmission pulses and said times of commencement required to produce said equality.

Preferably the sub-periods are equal. If the transmission pulses occur within either of the sub-periods, each sub-period may contain a short period during which the receiver is rendered insensitive. Such short periods may, to quote a practical figure, be about $1/100$ of a second and alternate such short periods will substantially correspond with the times of transmitted pulses. In this way direct reception of the transmitted pulses during alternate sub-periods is avoided and the required condition of equality of average energy content in the absence of received echoes is maintained by providing corresponding short periods of insensitivity during the remaining alternate sub-periods. It is, however, not essential to provide short periods of insensitivity in all sub-periods for short periods of insensitivity can be provided only in those alternate sub-periods which include a transmission and the required averaged energy content equality in the absence of received echoes obtained either by slightly reducing receiver sensitivity during the whole of the remaining sub-periods or slightly shortening the said remaining sub-periods or both.

Preferably the sets of alternate sub-periods are contiguous in time so that the instants of ending of one set of sub-periods are substantially co-incident with the instants of commencement of the other set of sub-periods and the receiver portion of the apparatus is arranged to provide a rectified output which is reversed in polarity during successive sub-periods and the relatively reversed outputs are integrated and compared, and departure from equality between the compared integrated resultants appearing as either a positive or negative out of balance voltage and being employed to alter the phase of the instants of commencement of the sub-periods in relation to the instants of transmission so as to restore equality, the depth or distance being measured in terms of the phase angle required for such equality.

The phase shift or alteration of the instants of commencement of the sub-periods in relation to the instants of transmission may be effected electro-mechanically or purely electrically.

Preferably the transmission period is at least twice the maximum echo time which the apparatus is designed to accommodate. During each transmission period there will be two sub-periods which, in the preferred and simplest case will each be equal to one half the transmission period and each of which will contain a short period of receiver suppression or insensitivity. In this way the transmission is caused normally always to lie within one particular set of alternate sub-periods so that the short periods of receiver suppression in the other sub-periods can occur half a transmission period after transmission. Accordingly receiver suppression will never cause suppression of a wanted echo. Both the sub-periods will contain a certain amount of noise energy and there may at times be random echoes. If, on switching on, the first of the sub-periods contains a main echo (i. e. in the case of an echo sounder, the echo corresponding to the sounding), the second sub-period will not and the average received energy content during the first and other "odd" alternate sub-periods will be considerably greater than the average energy content during the remaining "even" sub-periods and when the said average contents are compared there will be an out-of-balance resultant. This resultant is employed to alter the instants of commencement of the sub-periods until the out-of-balance resultant is zero which will occur when the change-over from one sub-period to the next takes place in the middle of the main echo so that half the echo is in each of two successive sub-periods. The depth or distance can, therefore, be indicated or recorded in terms of the phase shift required to produce this result.

Since, in general, the noise energy will be approximately the same in all sub-periods, a system in accordance with this invention will be, to a high degree, immune from false readings due to noise. Furthermore since the system operates by averaged or integrated energies (or more strictly the comparison of such energies) there will be no serious interference with correct working due to occasional failure to receive echoes from individual pulses.

The invention is illustrated in and further explained in connection with the accompanying drawings in which Fig. 1 is a graphical explanatory figure; Figs. 2 and 3 diagrammatically illustrate two embodiments; and Figs. 4 and 4a illustrate the association of the mechanical switching equipment with the circuit of Fig. 2.

These figures relate to the preferred type of arrangement in accordance with the invention in which both sets of sub-periods are equal and the transmission period is longer than twice the maximum required echo time.

Referring first to the explanatory graphs of Fig. 1 curve (a) is a representation of a typical echo-sounding receiver output wave form, showing regular peaks due to a transmission pulse at B, J, . . . and a single echo pulse at D, L, . . . superimposed upon continuous noise. Curve (b) of Fig. 1 shows the result obtained when: the receiver is suppressed for a short period A to C, I to K, (say 1/100 of a second) including the transmission pulse B, J; the receiver is suppressed for a similar short period, F to G, displaced in time by half a transmission period; and the sense of the receiver rectified output is reversed at E, H and M at intervals equal to half the transmission period. As will be seen positive receiver output current is delivered from C to E and H to I and negative output current from E to F and G to H. Thus positive and negative current is delivered for equal durations and, with random noise, the positive and negative noise currents tend to cancel. The echoes at D, L . . . however, give a positive unbalance resulting in a positive voltage which is utilised to cause the reversals at E, H, M . . . to be advanced in phase until E and M coincide with the mid-points of the echo at D, L . . . At this stage the unbalance voltage becomes zero and no further phase shift occurs (unless the depth changes) the receiver output current then being as represented in curve (c).

The above graphically illustrated action may be obtained in various different ways. Thus, for example, in one simple electro-mechanical arrangement, schematically represented in Fig. 4 a cam A rotated at a constant speed by a motor M is arranged to operate a switch AS once per revolution so as to control the required regular pulse transmission. The shape of cam A is shown by the face view in Fig. 4a beneath the corresponding part in Fig. 4. On the same shaft S1 with said cam is a second cam B actuating a second switch BS either once or twice per revolution and serving to suppress reception for a very short period in alternate sub-periods or in all sub-periods as may be required. The face view of cam B, shown in Fig. 4a beneath the corresponding part in Fig. 4, is represented with two risers one of which is in dotted lines at b to indicate that it is optional. A very short period of suppression coincides with each transmission. Also on the same shaft S1 is a third cam C also shown in face view in Fig. 4a beneath the corresponding part in Fig. 4 actuating a third switch CS which is so mounted that it can be rotated with respect to its actuating cam so that the phase relation between the actuation of the third switch CS and the moments of transmission can be varied. As indicated, the switch CS is carried by a disc D which also carries slip rings SR for providing connection via brushes BR to the switch contacts. The disc D is on a shaft S2 which is co-linear with shaft S1 and also drives a pointer P moving over a scale PS. The shaft S2 is driven by a motor armature 15 whose actuation will be described later herein. The third switch is employed to operate a reversing relay (not shown) to produce reversal of the polarity of the rectified output of the receiver. This periodically reversed rectified output is applied through a resistance 1 to the grid 2 of a tube 3 whose cathode 4 is connected to earth through the usual resistance 5 and whose grid 2 is connected to earth through a condenser 6. The resistance 1 and the condenser 6 constitute a resistance-capacity integrating circuit whose time constant is long with relation to the transmission period and may be, for example, five or more times that period. The output of the tube is supplied to a cathode follower tube 7 having its anode 8 connected to the positive terminal of a high tension source 9 and its cathode 10 connected through a cathode leg resistance 11 to the negative terminal of that source. Across the source are two resistances 12, 13 in series and the junction point of these two resistances is connected to the cathode 10 through the field winding 14 of a small D. C. motor the armature 15 of which is fed from a suitable source 16 through a limiting resistance 17. Thus the tube 7 feeds a bridge circuit which includes the field winding 14 and the whole arrangement is such that if no unbalanced voltage (integrated) is applied to the first tube 3 the motor field winding 14 is not energized. If, however, due to the presence of an echo in alternate sub-periods without any corresponding energy in the remaining sub-periods, there is an unbalanced voltage at the first tube 3, the field winding 14 is energized in one direction or the other and the motor rotates in one direction or the other. The motor is mechanically connected (by means not shown) to the mounting of the third switch so as to alter its position with respect to its operating cam and thereby alter the moments of receiver reversal. The sense of the mechanical connection is such as to cause the motor rotation to tend to restore balance and accordingly the third switch will be adjusted automatically in position until balance is restored when the motor will stop due to de-energization of its field. The extent of rotation of the motor or the alteration of the relative position of the first and third switches is utilized to indicate or record the depth or other distance either locally on the scale PS or at a remote point in any convenient well known way.

Fig. 3 shows in block diagram form a modification which operates purely electrically. Here a stable multi-vibrator 18 operating, for example, at 30 cycles per minute is utilized to trigger a pulse transmitter 19 supplying pulses to the transmitting projector 20 at approximately 2 second intervals. The receiving projector 21 supplies its output to an amplifier 22 which is suppressed for short periods by pulses supplied thereto by the pulse transmitter 19 so that the said receiving amplifier is insensitive during and immediately after transmitted pulses. The receiving amplifier 22 supplies its output to two gated amplifiers 23, 24 having their input circuits in parallel and gated by voltage supplied by a second multi-vibrator 25 operating at approximately 30 cycles per minute. Positive half cycles of the multi-vibrator 25 are utilized to gate one of the gated amplifiers (23 say) and negative half cycles are utilized to gate the other (24) so that the two said gated amplifiers are operative for successive half cycles of the output from the second multi-vibrator 25. One gated amplifier supplies its output to a rectifier 26 arranged to give a positive output and the other supplies its output to a rectifier 27 arranged to give a negative output. The two rectifier outputs are combined and fed to a resistance capacity integrator 28 having a time constant of say, ten seconds. The output from the integrator 28 is utilized to vary the frequency of the multi-vibrator 25 so as slightly to alter it and thereby produce a change in the relative phase of the two multi-vibrators 25, 18. For this purpose the output of the integrator may be used as controlling grid bias for the multi-vibrator, for it is well known that the frequency of a multi-vibrator may be controlled by grid bias. One such method of control is described by F. E. Terman in the "Radio Engineer's Handbook," first edition (1943), at page 512 (see footnote 3). It is, of course, well known that a small change of frequency applied for a given time is equivalent to a gradual change of phase. The arrangement is such that this change is in the direction to make the rectifier outputs from 26 and 27 of equal average value, i. e., to bring a received echo equally within the successive periods of operation of the two gated amplifiers 23, 24. Depth or distance indication or recording is effected by a circuit 29 which is responsive to relative phase and to which outputs from the two multi-vibrators 18, 25 are fed so that depth or distance is indicated or recorded at 29 in terms of the phase difference between the two multi-vibrators. One form which could be adopted for the indicator 29 is the Thyratron system described in the copending United States application Serial No. 4,424. As applied to the present invention the Thyratron would be connected to be ignited at the instant of transmission and extinguished by the positive to negative change over of the multi-vibrator 25. The average anode current of the Thyratron would then be a measure of phase and depth.

What I claim is:

1. A sub-aqueous distance measuring device of the periodic pulse echo type comprising means for periodically transmitting pulses; means for receiving reflected pulses; means for effecting the operation of said receiving means in a succession of equal sub-periods of which any two successive sub-periods have a combined duration not exceeding the transmission period; means for controlling receiver sensitivity during alternate sub-periods whereby, in the absence of received echoes, the received energy content during alternate sub-periods averaged over a length of time long relative to the transmission period substantially equals the received energy content in the remaining sub-periods averaged over the same time; means for comparing the two averaged energy contents; automatic means for altering the times of commencement of said sub-periods in dependence upon any inequality between said averaged energy contents until equality therebetween is restored; and means for indicating distance in terms of the time difference between transmission pulses and said times of commencement required to restore said equality.

2. A device as set forth in claim 1 wherein the receiving means include a rectifier circuit giving an output of rectified received energy and wherein there is provided means for reversing said rectified output during successive sub-periods, means for integrating and comparing the relatively reversed outputs; and means controlled by any departure from equality between the compared integrated reversed outputs for altering the phase of the instants of commencement of the sub-periods in relation to the instants of transmission so as to restore equality.

3. A device as set forth in claim 1 wherein the receiving means include a rectifier circuit giving an output of rectified received energy and wherein there is provided means for reversing said rectified output during successive sub-periods, means for integrating and comparing the relatively reversed outputs; and electro-mechanical means controlled by any departure from equality between the compared integrated reversed outputs for altering the phase of the instants of commencement of the sub-periods in relation to the instants of transmission so as to restore equality.

4. A device as set forth in claim 1 wherein the receiving means include a rectifier circuit giving an output of rectified received energy and wherein there is provided means for reversing said rectified output during successive sub-periods, means for integrating and comparing the relatively reversed outputs; and electro-mechanical means controlled by any departure from equality between the compared integrated reversed outputs for altering the phase of the instants of commencement of the sub-periods in relation to the instants of transmission so as to restore equality, said periodically reversed rectified receiver output being fed via a time constant circuit which is long in relation to the transmission period to control a tube in one arm of a bridge circuit having the field winding of a reversible electric motor across balance points thereof, said motor being mechanically connected to control the phase of the commencement of the sub-periods with relation to the instants of transmission.

5. A device as set forth in claim 1 wherein the receiving means include a rectifier circuit giving an output of rectified received energy and wherein there is provided means for reversing said rectified output during successive sub-periods, means for integrating and comparing the relatively reversed outputs; and purely electrical means controlled by any departure from equality between the compared integrated reversed outputs for altering the phase of the instants of commencement of the sub-periods in relation to the instants of transmission so as to restore equality.

6. A device as set forth in claim 1 wherein the receiving means include a rectifier circuit giving an output of rectified received energy and wherein there is provided means for reversing said rectified output during successive sub-periods, means for integrating and comparing the relatively reversed outputs; and purely electrical means controlled by any departure from equality between the compared integrated reversed outputs for altering the phase of the instants of commencement of the sub-period in relation to the instants of transmission so as to restore equality, said means for receiving reflected pulses feeding into two channels in parallel each containing a gated device and a rectifier, one of the rectifiers giving a positive output and the other a negative output, the rectified channel outputs being combined and utilized to control the phase of an oscillatory source arranged to open one gated device during one sub-period in each transmission period and to open the other gated device during a second sub-period of length substantially equal to the first sub-period and following immediately thereafter the output from said source being fed to a phase sensitive indicator or recorder for phase comparison with the output from another oscillatory source of stable phase and nominally identical frequency.

7. A method of effecting subaqueous distance measuring by transmitting pulses periodically from a projector to a reflecting object, receiving pulses reflected therefrom and measuring the distance of said object by observation of the time interval between transmission of a pulse and reception of its reflection said method consisting in periodically transmitting pulses; effecting reception in a succession of equal sub-periods such that any two successive sub-periods have a combined duration not exceeding the transmission period in length, so choosing the lengths of successive equal sub-periods and so controlling the receiver sensitivity during alternate sub-periods that the received energy content during alternate sub-periods averaged over a time which is long relative to the transmission period is substantially equal to the received energy content during the remaining alternate sub-periods averaged over the same time; rendering the receiver insensitive during a short period in at least each alternate sub-period alternate ones of said short periods substantially corresponding with times of transmitted pulses; comparing the averaged received energy content during alternate sub-periods with the averaged received energy content during the remaining sub-periods; controlling the times of commencement of the sub-periods in dependence upon any inequality between said averaged energy contents until said compared averaged energy contents are made equal; and indicating distance in terms of the time difference between transmission pulses and said times of commencement required to produce said equality.

JAMES WATT.

REFERENCES CITED

The following references are of record in the file of this patent:

UNITED STATES PATENTS

| Number | Name | Date |
| --- | --- | --- |
| 2,032,893 | Settegast et al. | Mar. 3, 1936 |
| 2,108,090 | Turner | Feb. 15, 1938 |
| 2,179,509 | Kietz | Nov. 14, 1939 |
| 2,358,441 | Bowsky | Sept. 19, 1944 |
| 2,433,385 | Miller | Dec. 30, 1947 |
| 2,446,527 | Chun et al. | Aug. 10, 1948 |